Inventor
Otto Erich Adler ated Jan. 12, 1965

United States Patent Office 3,165,095
Patented Jan. 12, 1965

3,165,095
CYLINDER HEAD
Otto Erich Adler, Hattingen (Ruhr), Germany, assignor to Beteiligungs- und Patentverwaltungsgesellschaft, mit beschrankter Haftung, Essen, Germany
Filed Apr. 29, 1963, Ser. No. 276,517
Claims priority, application Germany May 18, 1962
4 Claims. (Cl. 123—41.82)

The present invention relates to a cylinder head for water cooled internal combustion engines, especially for high speed two-stroke cycle diesel engines with uni-flow scavenging, which comprises two separate and superimposed water chambers extending substantially over the entire cross-section of the cylinder head and sequentially passed through by the cooling water. The two water chambers which are associated with one and the same cylinder are separated from each other by a partition with passage means therethrough through which said two water chambers communicate with each other, said passage means being passed through by cooling water in the direction of the respective cylinder axis.

With cylinder heads of this type, the cooling water has heretofore always been guided in such a way that the water passes from the lower to the upper water chamber. In this connection, by "lower water chamber" is meant that water chamber which is adjacent the combustion chamber, whereas by "upper water chamber" is meant the water chamber which is remote from said combustion chamber. Due to this way of conducting the water, the cooling water flows into the lower water chamber before it flows from the region below said passage means into the upper water chamber in a direction away from said cylinder. As a result thereof, that surface portion of the cylinder head which is directly adjacent the combustion chamber is at the outer portions of the cylinder head-cooled by the still relatively cool water to a greater extent than within the range below said passage means.

In order to obviate the harmful consequences of this situation, it has been suggested to pass the cooling water from the upper water chamber into the lower water chamber and to design the connection between the two water chambers as an annular passage surrounding a core tube and designed as a covering tube.

It is therefore an object of the present invention to provide a water cooled cylinder head which will overcome the above-mentioned drawbacks.

It is another object of this invention to provide a water cooled cylinder head which will be characterized by a considerable simplification of the inserts in cylinder heads heretofore known.

It is a further object of the present invention to avoid local overheating of that surface of the cylinder head which is adjacent the combustion chamber, to thereby prevent plastic deformations and tears.

These and other objects and advantages of the invention will appear from the following specification in connection with the accompanying drawings, in which.

The invention is characterized primarily in that the flow of cooling water passes from the upper water chamber into the lower water chamber, and that the connection between the two water chambers is formed by a guiding pipe which extends from the upper water chamber within the region of the partition between the two water chambers to a point as close as possible to the lower or bottom of the lower water chamber. In this way the cooling effect on that surface of the cylinder head which is adjacent the combustion chamber is greatly increased, and a uniform temperature distribution will be obtained.

In order to properly guide the flow of cooling water and to obtain a greater heat transfer surface, it is expedient on the lower bottom of the lower water chamber to provide a truncated cone-shaped or similarly designed core which extends into the adjacent opening of the guiding tube. This core is so arranged that between said core and the wall of the guiding tube there will be left free an annular chamber. Moreover, the guiding tube may within the area of said last-mentioned opening be widened in the manner of an annular nozzle. Finally, it is suggested to taper the guiding tube from its end adjacent said upper water chamber to an area shortly before its end adjacent the combustion chamber. In this way, an increased water velocity will be obtained at the hottest portions whereby the cooling effect will be increased.

Figure 1:
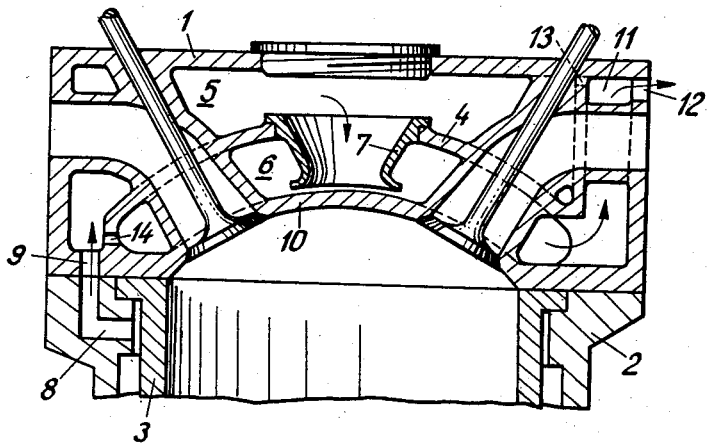
FIGURE 1 illustrates an embodiment with conically tapering guiding tube.
Figure 2:
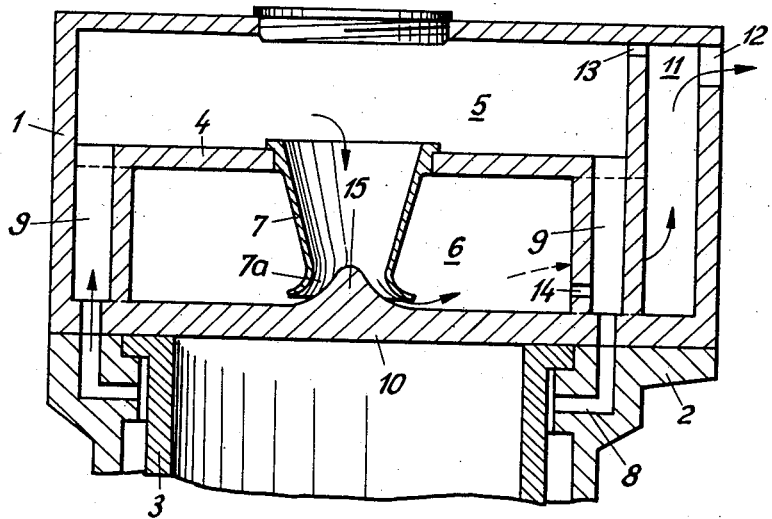
FIGURE 2 illustrates an embodiment with a truncated cone-shaped core arranged in the mouth of the guiding tube.

With reference to both FIGS. 1 and 2, the inner chamber of the cylinder head 1 which latter closes the engine block 2 and the cylinder bushing 3 is by a partition 4 subdivided into an upper water chamber 5 and a lower water chamber 6. Inserted into the partition 4 is a guide tube 7. Connected to the cooling water conveying lines 8 in engine block 2 are cool water conveying lines 9 passing into the upper water chamber 5. The guiding tube 7 is passed through by the cooling water in the direction from the upper water chamber 5 to the lower water chamber 6. The said guide tube 7 starts within the region of the partition 4 and extends to a point shortly in front of the bottom 10 of the lower water chamber 6.

The discharge of the cooling water from the cylinder head 1 is effected through passage means 11 with an outlet opening 12. Also the steam transfer opening 13 from the upper chamber 5 leads into the passage means 11. The arrangement furthermore comprises a restricted or narrow connecting bore 14 for the outflow of the cooling water from the lower water chamber 6 to the cooling water feeding line 9, for emptying the water from the water chamber 6 if the latter is to be cleaned or serviced for other purposes.

The guiding tube 7 may, in conformity with FIG. 1, be conically tapering for increasing the water velocity.

According to the embodiment of FIG. 2, in the mouth 7a of the guiding tube 7 there is provided a truncated cone-shaped core 15 yielding a larger heat transfer surface.

It is, of course, to be understood that the present invention is, by no means, limited to the constructions shown in the drawing, but also comprises any modifications within the scope of the appended claims.

What I claim is:

1. In combination: a cylinder, a cylinder head mounted on said cylinder and having partition means dividing said head into first and second cooling water chambers, said first water chamber having a water inlet for connection with a source of cooling water, said second water chamber having a water outlet for connection with water cooling means and also having a wall portion facing said cylinder and confining therewith a portion of a combustion chamber, said first water chamber being located behind said second water chamber when looking from said cylinder in axial direction thereof toward said cylinder head, conduit means extending through said partition means and establishing communication between said first water chamber and said second water chamber for conducting the water from said first water chamber to said second water chamber prior to the water passing through said chambers reaching said outlet, and core means arranged on said wall portion and partially extending into the adjacent portion of said conduit means in spaced relationship thereto so as to confine with the adjacent wall of said conduit means an annular passage.

2. In combination: a cylinder, a cylinder head mounted on said cylinder and having partition means dividing said head into first and second cooling water chambers, said first water chamber having a water inlet for connection with a source of cooling water, said second water chamber having a water outlet for connection with water cooling means and also having a wall portion facing said cylinder and confining therewith a portion of a combustion chamber, said first water chamber being located behind said second water chamber when looking from said cylinder in axial direction thereof toward said cylinder head, and conduit means extending through said partition means and establishing communication between said first water chamber and said second water chamber for conducting cooling water from said first water chamber to said second water chamber prior to the water passing through said chambers reaching said outlet, said conduit means extending from said first chamber into said second chamber and through a portion of the latter into close proximity of the central area of said wall portion and flaring adjacent said wall portion.

3. In combination: a cylinder, a cylinder head mounted on said cylinder and having partition means dividing said head into first and second cooling water chambers, said first water chamber having a water inlet for connection with a source of cooling water, said second water chamber having a water outlet for connection with water cooling means and also having a wall portion facing said cylinder and confining therewith a portion of a combustion chamber, said first water chamber being located behind said second water chamber when looking from said cylinder in axial direction thereof toward said cylinder head, and conduit means extending through said partition means and establishing communication between said first water chamber and said second water chamber for conducting cooling water from said first water chamber to said second water chamber prior to the water passing through said chambers reaching said outlet, said conduit means extending from said first chamber into said second chamber and through a portion of the latter and conically tapering from said first water chamber to the central area of said wall portion.

4. In combination in an internal combustion engine: a cylinder, a cylinder head mounted on said cylinder and having a bottom facing the interior of said cylinder and forming a part of the combustion chamber of said engine, said bottom having a portion arranged within the range of the longitudinal axis of said cylinder and forming the central portion of said bottom with regard to the cross section of said cylinder whereby in operation of said engine said bottom portion forms the hottest section of said bottom, said cylinder head having partition means dividing said head into first and second cooling water chambers, said first water chamber having a water inlet for connection with a source of cooling water, said second water chamber having a water outlet for connection with water cooling means, said first water chamber being located behind said second water chamber when looking from said cylinder in axial direction thereof toward said cylinder head, and conduit means extending through said partition means and ending short of said bottom portion and establishing communication between said first water chamber and said second water chamber for conducting cooling water from said first water chamber to said second water chamber and directly to said bottom portion prior to the water passing through said chambers reaching said outlet whereby during operation of said engine cooling water from said first water chamber is directed directly to the hottest portion of said bottom.

References Cited in the file of this patent
UNITED STATES PATENTS

| | | |
|---|---|---|
| 1,819,744 | Dunkelmann | Aug. 18, 1931 |
| 2,309,833 | Elze | Feb. 2, 1943 |
| 3,074,389 | Lilly | Jan. 22, 1963 |